United States Patent [19]

Sanders, Jr.

[11] 4,076,448
[45] Feb. 28, 1978

[54] POWER GENERATING WATER TURBINE

[76] Inventor: Davis A. Sanders, Jr., P.O. Box 908, Baton Rouge, La. 70821

[21] Appl. No.: 734,754

[22] Filed: Oct. 22, 1976

Related U.S. Application Data

[63] Continuation-in-part of Ser. No. 596,869, Aug. 21, 1975, abandoned.

[51] Int. Cl.² ............................................. F01D 1/08
[52] U.S. Cl. ........................................ 415/2; 415/184; 415/205; 417/334
[58] Field of Search .......................... 415/2-4, 415/8, 203, 204, 205, 60, 62, 66, 183-185; 417/334, 175, 199 A

[56] References Cited

U.S. PATENT DOCUMENTS

| 28,992 | 7/1860 | Martin | 415/184 |
| 264,164 | 9/1882 | Jackson | 415/4 |
| 318,223 | 5/1885 | Traux | 415/184 |
| 1,646,405 | 10/1927 | Innes | 415/184 |
| 1,650,475 | 11/1927 | Trefz et al. | 415/184 |
| 1,857,965 | 5/1932 | Lidiak | 415/184 |
| 1,879,812 | 9/1932 | Miller | 415/183 |

FOREIGN PATENT DOCUMENTS

| 559,239 | 9/1923 | France | 415/2 |

Primary Examiner—C. J. Husar
Attorney, Agent, or Firm—Roy, Kiesel, Patterson, Hudson & Abadie

[57] ABSTRACT

A water turbine for generating power is disclosed utilizing a multiple scroll housing for gathering, concentrating and guiding equal amounts of water about the turbine wheel or impeller.

2 Claims, 4 Drawing Figures

POWER GENERATING WATER TURBINE

RELATED APPLICATIONS

This is a continuation-in-part of U.S. patent application Ser. No. 596,869 entitled "Device for Generating Power from Water Flow" filed by the inventor herein on Aug. 21, 1975, now abandoned, and reference is made to the parent application for purposes of securing the benefit of its filing date, and all subject matter disclosed herein is included herein.

BACKGROUND OF THE INVENTION

1. Field of the Invention

This invention relates broadly to water turbines, and more particularly to water turbine designs for generating power from slow moving water streams.

2. Prior Art

The use of water turbines to generate power has been known for centuries, and during this period of time many changes and improvements in design have been made. For example, in high velocity water streams such as found in dams, turbines such as disclosed in Reiffenstein U.S. Pat. No. 1,722,158 entitled "Water Power Engine" and Reiffenstein U.S. Pat. No. 3,041,570 entitled "Turbo Machine" can be used.

In slow moving water streams (i.e., less than 15 mph) the problem of generating sufficient power to make the turbine useful is incurred. This has led to designs such as found in Hall U.S. Pat. No. 11,373 entitled "Water Wheel" which attempts to direct the water in the turbine housing more efficiently, as well as, to the design found in my co-pending patent application, indicated above, which increases the velocity of the water in the turbine housing. There is, however, a further need to increase the water action on the turbine wheel to obtain additional power from the water turbine.

OBJECTS OF THE INVENTION

Therefore, one object of the invention is to provide a water turbine which more efficiently utilizes the water action in its impellers.

Another object of this invention is to provide a water turbine that utilizes multiple water channels for directing water to the impellers.

Still another object of this invention is to provide a water turbine that has an increased discharge rate of the water entering the water turbine.

These and other objects and advantages of this invention shall become apparent from the ensuing descriptions of the invention.

Accordingly, a water turbine is provided comprising an impeller assembly having multiple blades mounted perpendicularly on a rotatable axle, and a housing assembly having a wall fixed about and attached to the impeller assembly wherein the wall has an opening extending outward and angularly to receive a water stream, said opening comprising multiple flow channels formed by a series of curved plates wherein each channel has a water entrance section wider than a water exit section, each water exit section being located at a different area about the blades.

PREFERRED EMBODIMENTS OF THE INVENTION

Figure 1:
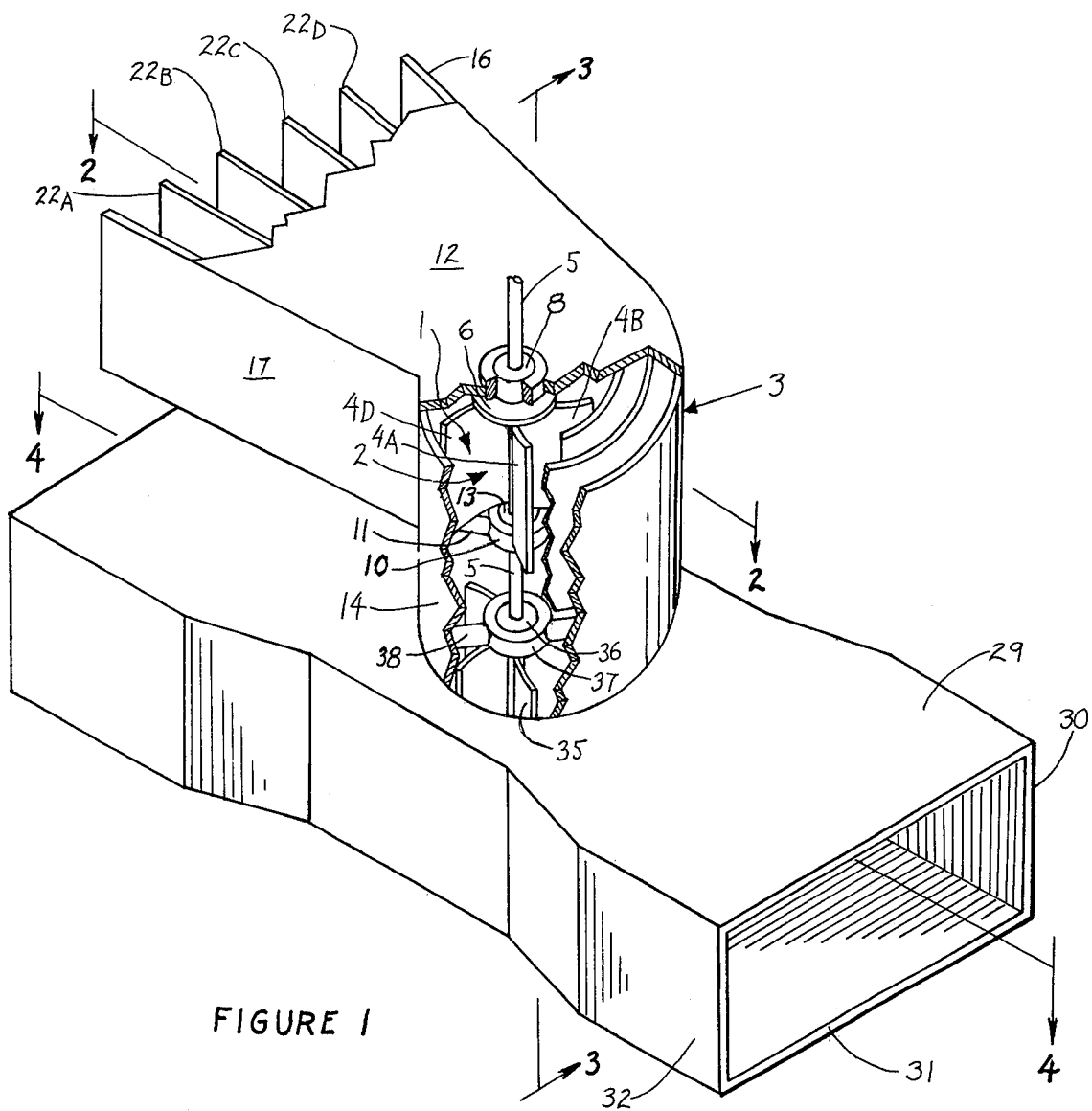
FIG. 1 is a perspective cutaway view of one preferred embodiment illustrating the use of a second turbine within a venturi eductor.
Figure 2:
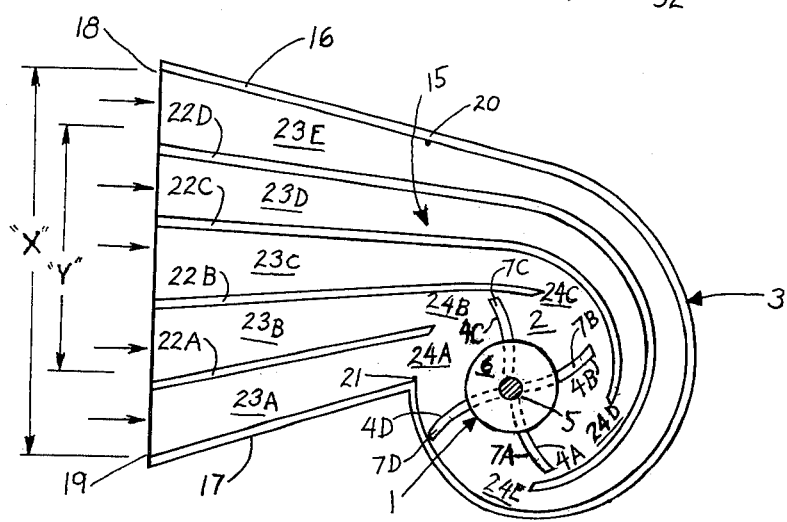
FIG. 2 is a cross-sectional view taken along lines 2 — 2 of FIG. 1 illustrating cross-sectional view of the multiple flow channels.

Referring first to FIGS. 1 and 2, a preferred embodiment of the water turbine of this invention is illustrated comprising an impeller assembly 1 mounted within cavity 2 of housing assembly 3. More particularly impeller assembly 1 comprises multiple blades 4A, 4B, 4C and 4D mounted perpendicularly on rotatable axle 5. In a preferred feature, blades 4 are held rigidly fixed in position by plate 6 welded or otherwise attached to the top edges 7A, 7B, 7C and 7D of blades 4A, 4B, 4C and 4D respectively. Plate 6 is provided with conventional collar bearing 8 through which axle 5 extends and is held in position for rotation. In a preferred feature, rim section 12 is adjacent and welded to assembly housing side wall 14.

Housing assembly 3 in one preferred embodiment has a curbed side wall 14 which forms cavity 3 in which impeller assembly 1 is positioned. Side wall 14 extends about two-thirds of the way about impeller assembly, thus forming an opening 15 through which water can enter. Lip wall sections 16 and 17 are attached to side wall 14 and extend outward and angularly to the water flow that will enter opening 15. In this manner, the distance "x" between lip edges 18 and 19 will be greater than the distance "y" between side wall opening edges 20 and 21. Between lip wall sections 16 and 17 and extending into cavity 3 about blades 4A, 4B, 4C and 4D is a series of curved plates 22A, 22B, 22C and 22D which with lip wall sections 16 and 17 form multiple flow channels 23A, 23B, 23C 23D and 23E, that direct the water flow about impeller assembly 1. In a more preferred feature, water exit areas 24A, 24B, 24C, 24D and 24E are located equally distant about blades 4 so as to insure that a portion of the water flow will strike all of blade 4 at all times. This particular feature substantially reduces any dead space that normally develops in a water turbine and increases the power generated by the water turbine since the force of the water strikes each blade.

Figure 3:
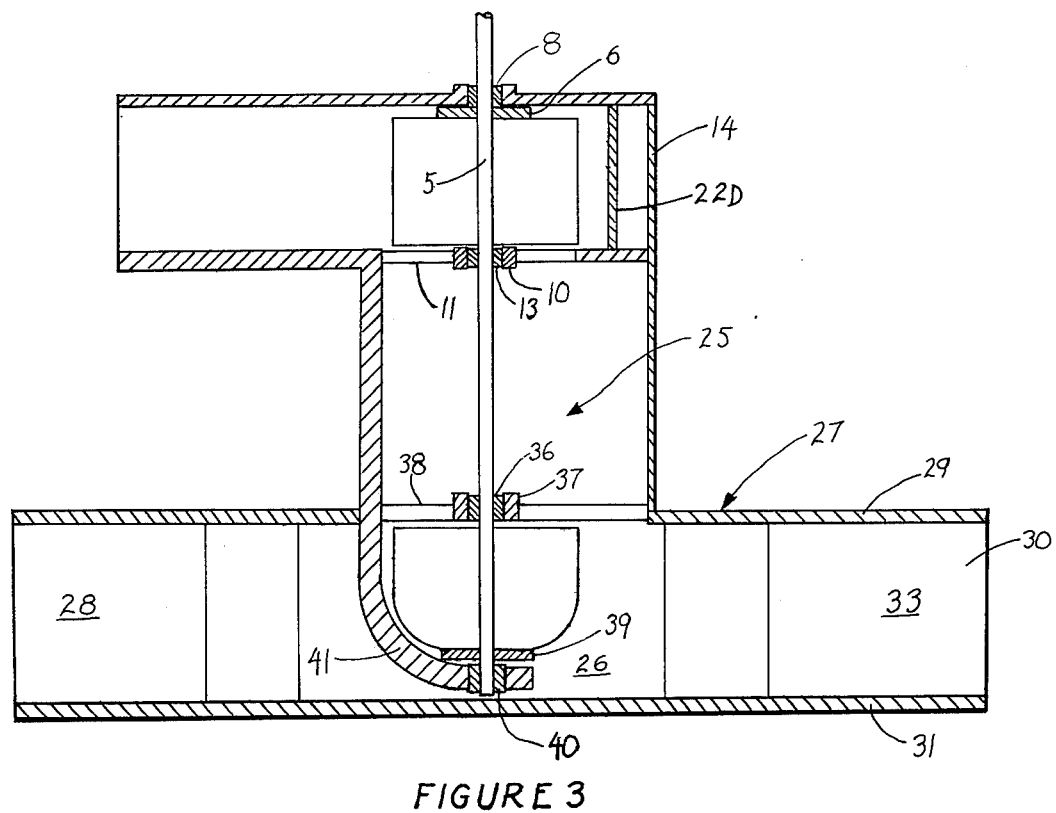
FIGS. 3 and 4 are cross-sectional views taken along lines 3 — 3 and 4 — 4, respectively, illustrating one embodiment of the discharge channel, second turbine and venturi eductor.
Figure 4:
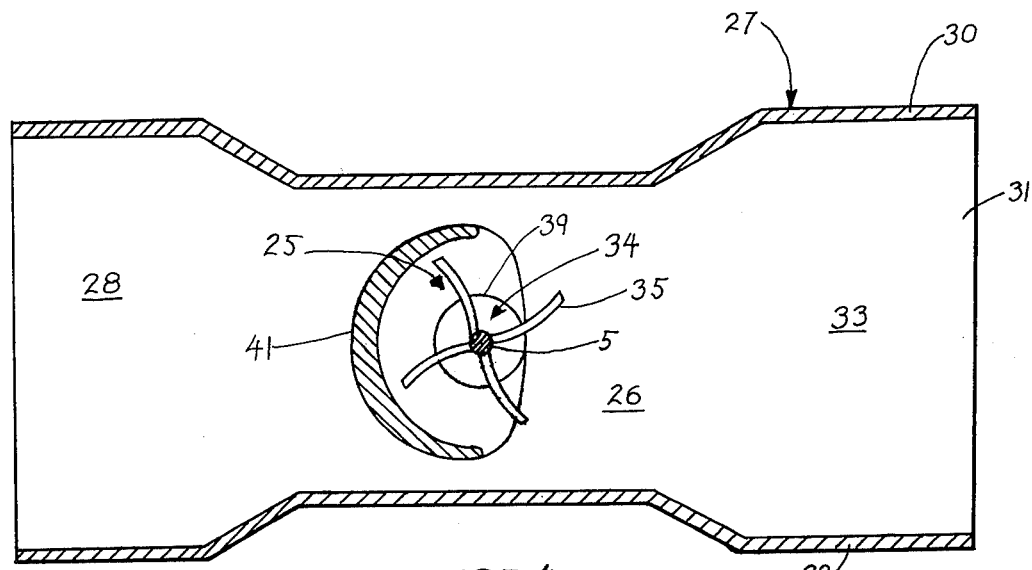

Another severe problem in water turbine design has been the efficient removal of water that has entered the turbine in order to avoid back-up water which can impede the turning of blades 4. Referring now particularly to FIGS. 3 and 4, a preferred embodiment is illustrated which substantially reduces the back-up water problem. Attached to housing assembly 1 and located directly below impeller assembly 3 is penstock 25 which directs water from impeller assembly 3 to restricted channel 26 of venturi eductor 27 having an entrance opening 28 formed by eductor wall panels 29, 31, 31 and 32, a separate water flow from the same stream as the water flow entering housing assembly 1. The second water flow passes through opening 28 and past penstock 25 in restricted channel 26 reducing the pressure in channel 26 creating a suction within penstock 25 which draws water from cavity 3 and forces it out exit opening 33 along with the second water flow.

In a more preferred embodiment, a second impeller assembly 34 can be positioned at the bottom of penstock 25 for receiving the spiraling water traveling down penstock 25. Impeller assembly 34 can be synchronized with impeller assembly 1 by proper positioning and sizes of its blades 35 whereby more energy from the water flow can be utilized.

In operation, the widened opening 15 gathers a large volume of water from the water flow and angularly directs it into more restricted channels 23. This converts the linear momentum of the water flow into an angular momentum of greater velocity resulting in an increased rate of spin of blades 7. By channeling the water flow evenly about blades 7, more force of the spiraling water is imparted to the blades. Now, by providing penstock 25 and venturi eductor 27 the large volume of water directed into cavity 3 can be removed without creating any water back-up which could decrease the rate of spin of blades 7. Second impeller assembly allows even further use of the force of the spiraling water by the water turbines to generate power. This power generation could, of course, be done by converting axle 5 by conventional drive means (belts, pulleys, etc.) to an electrical generator.

There are, of course, many alternate embodiments for instance by way of example only, changes and modication of impeller assembly structure, number and shape of blades in the impeller assemblies, etc. all of which are meant to be included within the scope of this invention as defined by the following claims.

What I claim is:
1. A water turbine comprising:
   (a) an impeller assembly having multiple blades mounted perpendicularly on a rotatable axle,
   (b) a housing assembly having a frame fixed about and attached to said impeller assembly, said wall having an opening for receiving a water stream, said opening comprising multiple flow channels formed by a series of curved plates wherein each channel has a water entrance section wider than a water exit section, each water exit section located at a different area about said blades, said opening extending outward and angularly to said water stream,
   (c) a water vortex discharge assembly having a discharge channel to receive said water from below said blades and delivering said water to a venturi eductor having a restricted passageway, and
   (d) a second turbine located within said discharge channel at a position within said restricted passageway.
2. A water turbine according to claim 1 wherein said water exit sections are located equally distant about said blades.

* * * * *